Patented Apr. 2, 1940

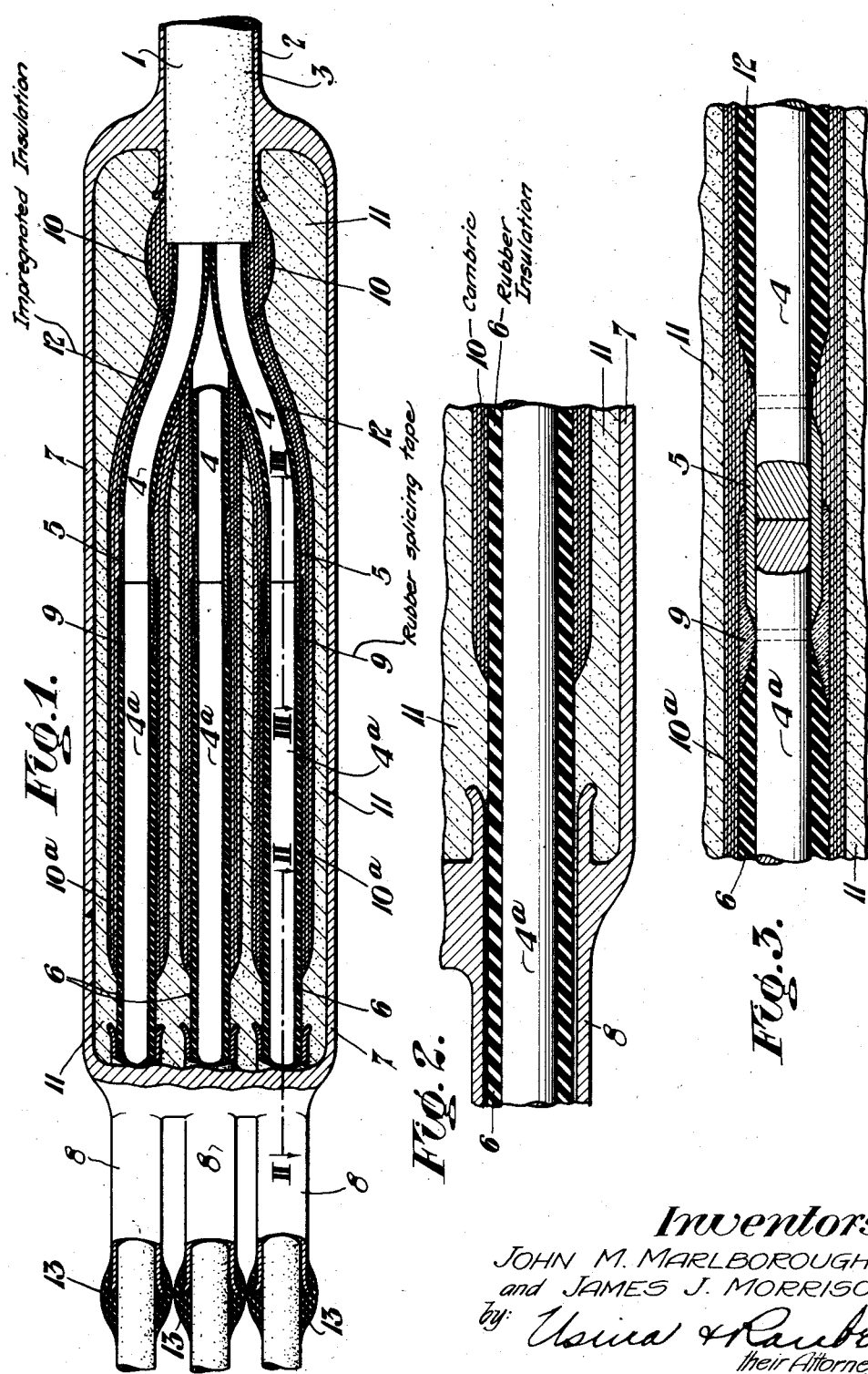

2,195,933

UNITED STATES PATENT OFFICE 2,195,933

SPLICED CABLE JOINT

John M. Marlborough, Millbury, and James J. Morrison, Worcester, Mass., assignors to The American Steel and Wire Company of New Jersey, a corporation of New Jersey Application September 24, 1936, Serial No. 102,402

1 Claim. (Cl. 174—21)

This invention relates to spliced cable joints and, more particularly, to the splicing of electric cables provided with dissimilar insulations of types not readily united to form a moisture-impervious covering for the joint.

In certain cases, it is desirable to join electric cables that are provided with insulating materials having different properties; such as, a cable insulated with a rubber compound, and a cable insulated with a material of an oily nature, such as, paper insulation. In such a union, trouble is encountered by virtue of the deleterious action of the oil in the one insulation upon the rubber of the other and, also, in procuring a covering over the joint that is impervious to moisture. Watertightness is very necessary, since the entrance of any moisture along the rubber insulated strand, whether internally or externally, will speedily cause the ruin of the paper insulation in the adjoined cable.

It is, therefore, an object of this invention to provide a waterproof splice joint between a rubber insulated cable, particularly a rubber insulated cable not having an overall lead sheath; and a paper insulated cable, particularly one provided with such a sheath.

Another object is to provide a splice that is simple in construction, easy to make, and that possesses all of the advantages to be derived from the use of a lead sleeve type of splice, corresponding to those used in joining two lead-covered cables.

Still another object is the provision of a splice of the character described, which may be formed by conventional splicing methods now in use, thus eliminating the necessity of providing special materials, or other than the ordinary workmen familiar with making the regular types of splices.

Other objects and advantages will become apparent after referring to the drawing, in which:

Figure 1 represents a longitudinal mid-sectional view taken through a splice made in accordance with the present invention.

Figure 2 is an enlarged fragmentary sectional view taken along the line II—II of Figure 1.

Figure 3 is another enlarged fragmentary sectional view taken along the line III—III of Figure 1.

Referring more particularly to the drawing, in which like reference characters refer to like parts throughout:

One of the cables to be spliced is indicated by the numeral 1, and is shown as provided with a lead sheath 2, immediately underlying which is a sheath of any suitable insulation 3. Within the lead sheath 2 and the layer of insulation 3 is a plurality of conductors 4, either of the single wire or multi-strand type, each of which is covered by an oil-impregnated insulation 12.

In preparing the cable 1 for the splicing operation, the lead sheath 2 is removed for a suitable distance from an end of the cable. The layer of insulation 3 is also removed to expose the individual insulated conductors 4, but so as to leave a portion thereof extending beyond the lead sheath 2. The insulation 12, for a distance adjacent the end of each of the conductors 4, is removed in order to afford electrical contact between the bare conductors and a plurality of copper sleeves 5, which are sweated to the ends of each thereof.

The other cable to be spliced is comprised of a plurality of conductors 4ª, each having an individual covering of rubber insulation 6 disposed along its length. The rubber insulation, for a distance adjacent the ends of each of the conductors, is removed to afford electrical contact between the bare conductors and the copper sleeves 5, into which they are introduced and made fast in a manner similar to that already described. A length of lead pipe 8 is positioned about each of the rubber insulated conductors, a suitable distance from their ends, as shown, for purposes to be hereinafter described.

The rubber insulation 6 is gradually tapered away toward the bared ends of the conductors to a point of termination immediately adjacent the copper sleeves 5. The sleeves 5 are also preferably tapered to define a very shallow V-shaped annular depression adjacent the joint. Within this depression rubber splicing tape 9 is served to overlap the rubber insulation 6 and the copper sleeves 5 for a substantial distance in each direction. This application of rubber effectually seals the exposed portion of the underlying conductor, and serves to exclude moisture therefrom. That is, there may be longitudinal travel or seepage of the oil from the paper cable in a laminated structure so that the addition of the varnished silk does not assure complete stoppage of all travel across the adjoining section. The rubber splicing tape 9, besides acting as a splice, serves also as a gasket, since any seepage of oil longitudinally along the varnished cambric tapes would act on this rubber layer which would, in turn, serve as a barrier between the oil saturated paper on one side of the joint and the rubber insulation on the other side. The fact that it would be softened and deteriorated by any oil action would not nullify the other and prime objective; namely, excluding from the joint any moisture which may seep from the strand of the rubber insulated conductor.

The insulation 12, about the individual conductors of the cable 1, is composed of paper, or other suitable material, impregnated with oil. As has already been indicated, this paper insulation terminates adjacent the copper sleeves 5 upon each of the conductors, which sleeves are also tapered adjacent the paper insulation to make a graduated joint. Immediately overlying the paper covered conductor, and extending across the copper sleeve joint onto the rubber insulated conductor, is a continuous and heavy seizing of varnished cambric 10a, which is applied to the various conductors in like manner. Another seizing of cambric 10 is provided to overlie the initial layer of cambric and the overall layer of insulation 3 projecting from the lead sheath 2 of the cable 1, in such manner as to substantially abut the end of the lead sheath 2, which is flared or "belled" to receive the same.

A lead sleeve 7 is then provided to encase the entire joint, which is wiped down to tightly embrace the lead sheath 2 on the cable 1, and at its other end is similarly fitted to each of the sections of lead pipe 8 disposed about each of the rubber insulated conductors 4. The ends of each section of lead pipe are flared or "belled" in a manner similar to that of the lead sheath 2. The lead sleeve 7 is then filled with a joint compound 11 of a standard solid type. This filling compound when applied is in a liquid condition and, therefore, flows to fill every crevice within the lead sheath, including the lead pipe 8 and sheath 2, into which it flows a substantial distance before solidifying. In this manner a simple and effective seal against the entrance of moisture is provided, and it is for this purpose that the pipe and sheath ends are flared, as has been described. At the outer ends of each of the lead pipes 8, a covering of rubber insulation 13 is applied to overlap the rubber insulation of the conductor, and the end portions of the pipes 8. Such insulation may be applied in the form of rubber tape, and vulcanized in place to constitute an elastic, though firm, cover of high mechanical strength and of great protective value.

It will be seen that in the splice of the present invention all dissimilar insulating materials of incompatible properties have been maintained apart without sacrificing the protective strength of the joint covering, and its imperviousness to moisture. The splice is marked by its excellence of electrical conductivity; its imperviousness to moisture; and its well insulated features. And, although a definite combination of conductors and insulating materials has been illustrated herein, it is obvious that this type of splice is applicable to many different combinations of conductors. Likewise, if the conductors are employed for use in circuits of the higher order of voltages, suitable shielding may be provided for each of the conductors in the usual manner, which shielding may be carried across the joint in accordance with the usual practice. It will be apparent that although varnished cambric tape is indicated as the main body of joint-insulation herein, other suitable material may be used, in whole or in part, for such service. The invention is equally applicable to the splicing of conductors having any combination of insulation; as, where one of the conductors is lead covered and the other thereof is without such sheath, and is by no means limited to the splicing of rubber and paper insulated conductors, such as have been employed herein for illustrative purposes only.

While we have shown and described one specific embodiment of our invention, it will be understood that we do not wish to be limited exactly thereto, since various modifications may be made without departing from the scope of our invention, as defined by the following claim.

We claim:

An electrical splice between an imperviously armored cable having oil-impregnated insulation, and an unarmored cable having insulation subject to injury from oil; comprising an electrically conductive element for establishing an electrical connection between the conductors of said cables, said electrically conductive element being constructed and arranged to maintain the incompatible insulations in spaced relation, rubber splicing material connecting and overlapping one end of the insulation of the unarmored cable and the adjacent end of said electrically conductive element thus excluding from the splice any moisture which may seep from the strands of the conductor of the unarmored cable, said rubber splicing material being compatible to the insulation to whose end it is connected and overlapping and terminating short of the remote end of said electrically conductive element, an insulatory covering disposed about said electrically conductive element and said rubber splicing material and extending into overlapping relation to each of said insulations, said covering being of a kind unaffected by oil and non-injurious to either of said insulations, a section of impervious armoring about said unarmored cable, and a sleeve encasing the joint and connecting said section of armoring on said unarmored cable to the armoring on the other cable, said sleeve being substantially closed and filled with an insulatory plastic cement to effectually seal the same.

JOHN M. MARLBOROUGH.
JAMES J. MORRISON.